Patented Feb. 11, 1930

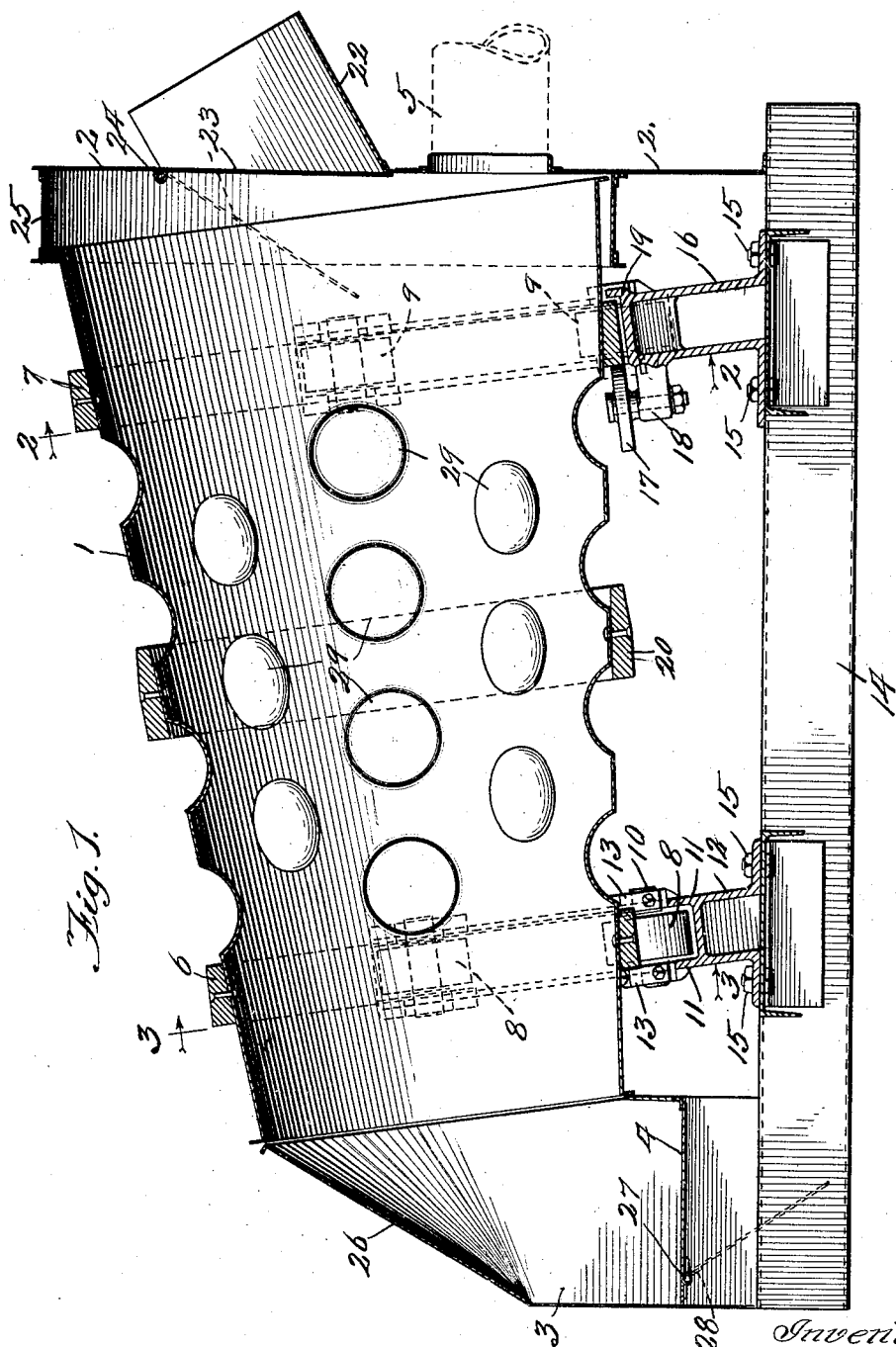

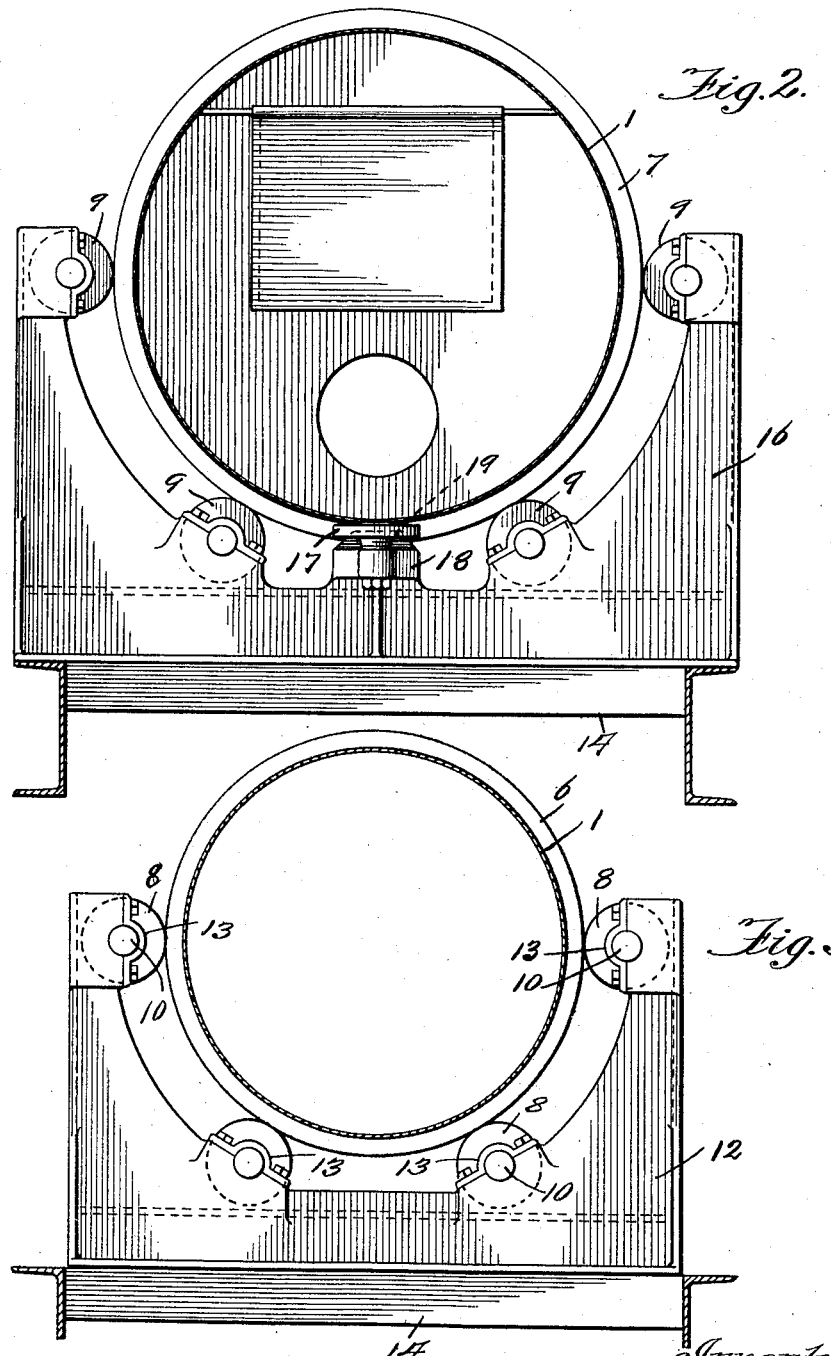

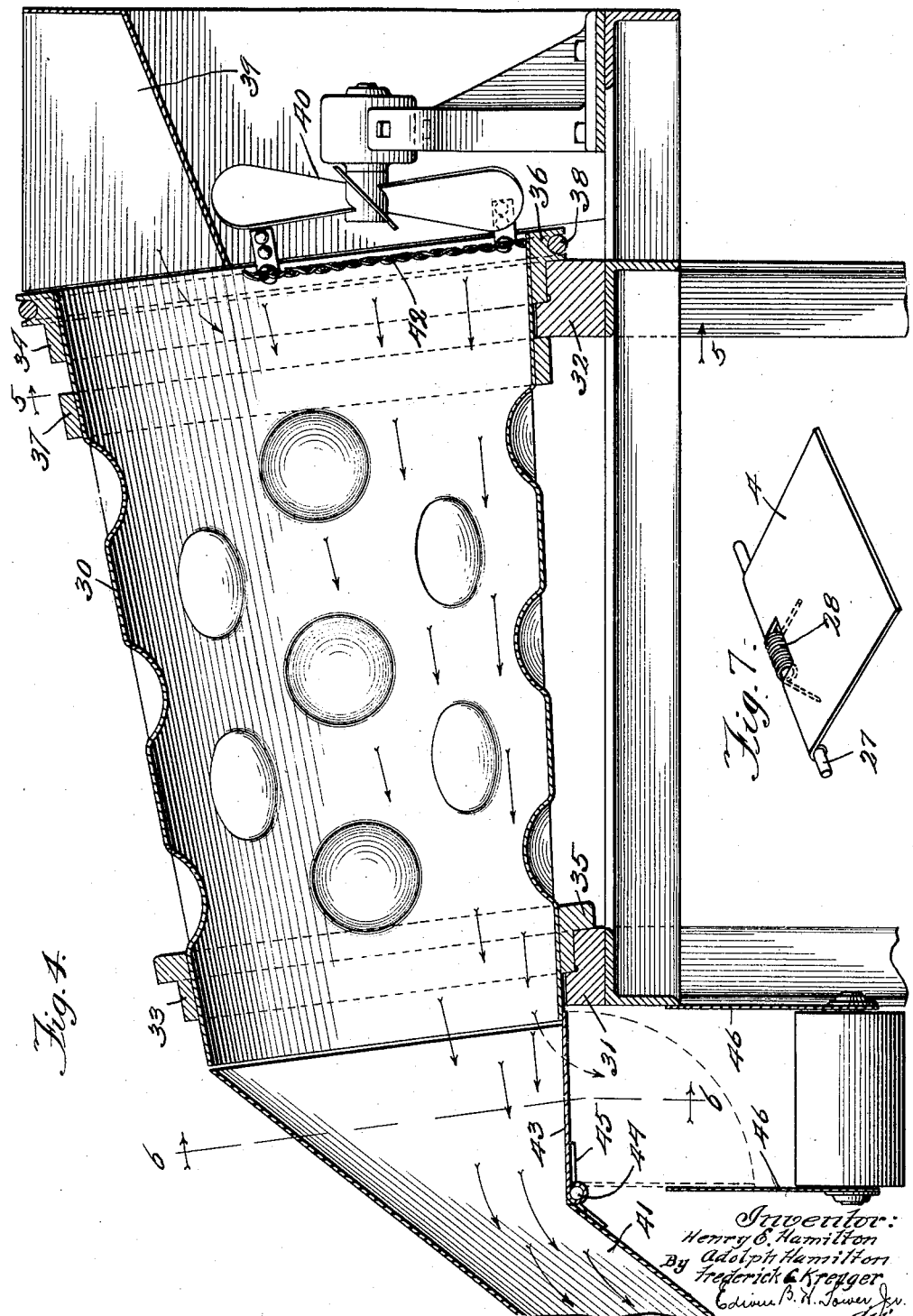

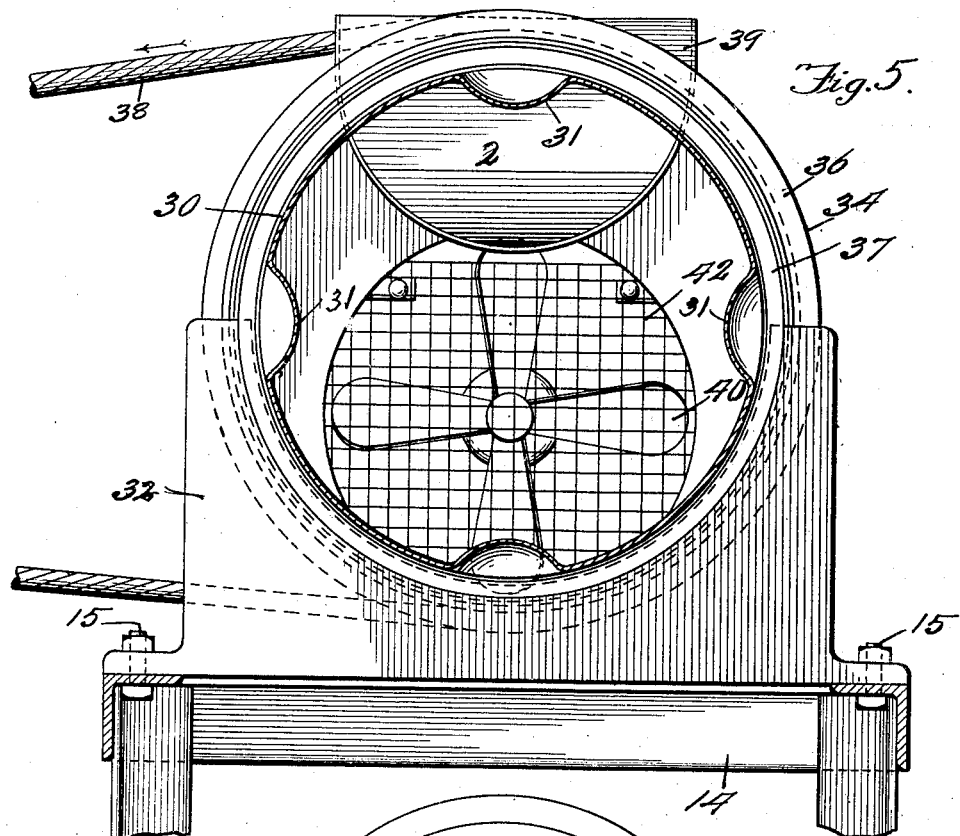
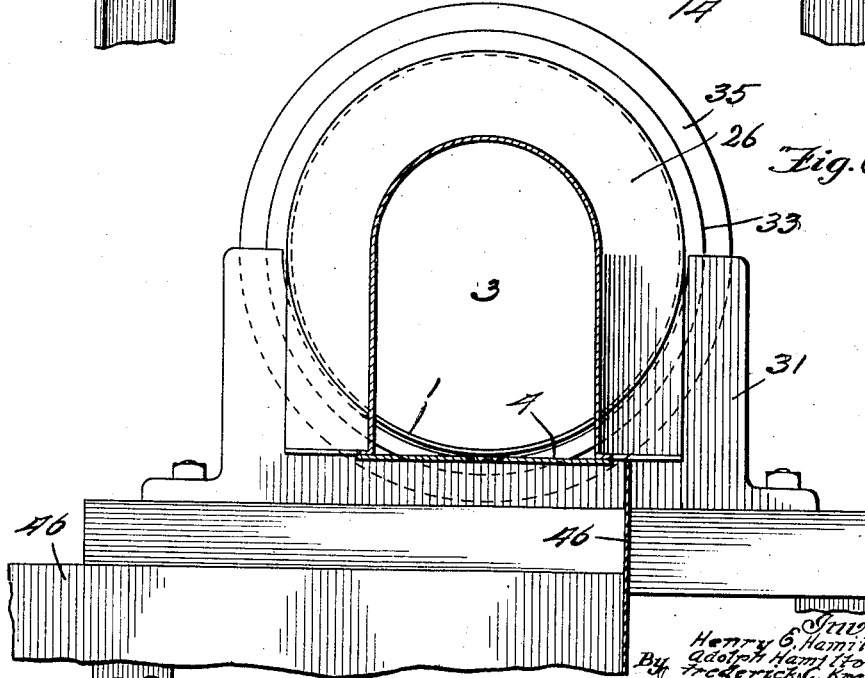

1,747,002

UNITED STATES PATENT OFFICE

HENRY E. HAMILTON, FREDERICK C. KRUEGER, AND ADOLPH HAMILTON, OF NEW LONDON, WISCONSIN, ASSIGNORS, BY MESNE ASSIGNMENTS, TO SAID HENRY E. HAMILTON

METHOD OF AND APPARATUS FOR REMOVING THE OUTER COVERINGS OF VEGETABLES AND THE LIKE

Application filed September 20, 1924. Serial No. 738,872.

This invention relates to a leafing machine.

It more particularly relates to a leafing machine especially adapted for removing the outer leaves from the heads of cabbages and similar vegetables after such vegetables have been cored and the outer leaves thereof loosened.

An object of the invention is to provide a machine for removing the outer leaves from headed vegetables.

Another object is to provide a machine in which the vegetables and the outer leaves will be separated from each other and discharged from the machine through separate outlets.

Another object is to provide a machine which may be continuously operated, to which the vegetables may be continuously fed, and from which the vegetables will be continuously and automatically removed at one point and the separated leaves at a different point.

Another object is to provide a leafing machine that is composed of a minimum number of parts, permits of easy assembly, and is economical to manufacture.

Other objects and advantages will hereinafter appear.

Embodiments of the invention are illustrated in the accompanying drawings, in which:

Fig. 1 is a longitudinal vertical section of one form,

Fig. 2 is a section on line 2—2 of Fig. 1,

Fig. 3 is a section on line 3—3 of Fig. 1,

Fig. 4 is a longitudinal vertical section of another form,

Fig. 5 is a section on line 5—5 of Fig. 4,

Fig. 6 is a section on line 6—6 of Fig. 4,

Fig. 7 is a perspective view of the outlet door.

In accordance with the invention, as preferably embodied, the machine is provided with a rotatable container having annular protuberances or projections arranged on the interior thereof. The vegetables are fed into this container.

Headed vegetables, such as cabbage and the like, have outer leaves which are unclean and undesirable as a food.

After such vegetables have been cored, these outer leaves are partly separated therefrom and may be entirely separated from the vegetables by agitation thereof.

The container being rotated and the vegetables therein striking against the protuberances or projections, causes these outer leaves to loosen and to separate from the vegetables.

A strong current of air, directed through the container, carries the loose leaves through their outlet.

The container, being inclined to the horizontal, the vegetables work toward the lower end thereof and finally fall through their outlet.

The machine comprises, in general, a container 1 open at both ends, an inlet 2, outlets 3 and 4 and a pipe or other suitable means 5 for directing a strong current of air through the container from the inlet end to the outlet end thereof.

Bands 6 and 7 are riveted or otherwise fastened to the ends of the container to provide tracks for the rollers 8 and 9, respectively.

Rollers 8 are mounted on shafts 10 journaled in the sides 11 of a frame 12.

Caps 13 are bolted or otherwise secured to the sides 11 to hold rollers 8 and shafts 10 in proper position, as shown in Fig. 3.

The frame 12 may be secured to a suitable supporting base 14 by means of bolts 15.

A similar frame 16 is likewise secured to the supporting base 14, adjacent inlet 2, to support rollers 9.

The frame 16 is made to support each roller 9 above the corresponding roller 8, so that the container 1 revolves about an axis inclined to the horizontal.

A roller 17, to serve as a thrust roller is journaled in a bracket 18, formed on frame 16, to engage the adjacent side of the band or track 7 and hold the container against lateral displacement from the rollers 8 and 9.

An upwardly extending lip 19, also formed on frame 16, prevents possible displacement of the container from the rollers in the opposite direction.

A pulley 20 for a driving belt, which causes the container to rotate, is riveted to the container at the center thereof.

The inlet 2 comprises a back 21 and a chute or hopper 22.

A plate 23 is pivoted at 24 to the back 21 to close the end of hopper 22 when the machine is not in use.

A stationary cylindrical member 25 is secured to the back 21 and is formed to fit over the inlet end of the container to prevent air from escaping and the possible movement of the vegetables from this end of the machine.

The pipe 5 is supported below hopper 22 to direct a strong current of air through the lower half of the container.

A hood 26 is open at one end to provide the outlet 3 and is formed at the other end to fit the outlet end of the container.

The trap door or outlet 4 for the vegetables is pivoted at 27 to the bottom of the hood 26.

A spring 28 is coiled above pivot 27 to hold the trap door in closed position, as shown in Fig. 7.

The container 1 has indentations therein forming a plurality of annular protuberances or projections 29 on the inside thereof. These annular protuberances or projections may be pressed from the container.

The operation of the machine is as follows:
The vegetables are fed into the hopper 22 and drop through the inlet 2 into the container.

The container is rotated and the vegetables jostled about therein to tear away or separate the outer leaves.

Separation of the leaves is facilitated by the annular protuberances or projections 29 against which the cabbages strike.

The loose leaves being lighter than the vegetables, are carried or blown through the container by the strong current of air and discharged through outlet 3.

The vegetables roll along the container under the action of gravity and drop through trap door 4 into a suitable receptacle.

The outer or loose leaves are thereby detached and separated from the headed vegetables.

The outlet or trap door 4 is arranged between outlet 3 and the container so that the loose leaves are discharged from the machine by being blown over or past the headed vegetables as they drop through the door.

In the modification shown in Figs. 4 to 6, the container 30 is rotatably supported at an angle to the horizontal by rabbetted bearing blocks 31 and 32.

Rings 33 and 34 are shrunk or otherwise secured to the ends of the container to fit bearing blocks 31 and 32, respectively.

The rings 33 and 34 are provided with flanges 35 and 36, respectively, to hold the container in position on the bearing blocks.

A ring 37 is secured to the container adjacent ring 34 to engage the adjacent face of bearing block 32 to prevent possible displacement of the container in the opposite direction.

The container is thereby supported for rotation and definitely positioned with respect to the bearing blocks.

The ring 34 is provided with an annular groove to receive a driving rope or cable 38 for rotating the container.

A hopper 39 is supported at the inlet end of the container to receive and direct the vegetables into the latter.

A fan 40 is supported below hopper 39 to direct a strong current of air through the container and the outlet 41, as indicated by the arrows in Fig. 4.

Wire mesh 42 may be supported adjacent fan 40 to prevent possible movement of the vegetables from the inlet end of the container into the path of the fan blades.

An outlet or trap door 43 for the vegetables is pivoted at 44.

A spring 45 may be arranged on the pivot 44 to hold the trap door in closed position.

The vegetables pass from the container 30 onto trap door 43, and by their own weight open the latter against the action of the spring and drop onto a suitable conveyer.

The conveyer shown in the drawings is a belt conveyer of the usual type, having guards 46 at the end and at either side thereof to prevent the vegetables from rolling off the belt.

This invention is, of course, susceptible of various other modifications and adaptations, and it will be obvious that the invention may be applied to other vegetables than cabbages, or to fruit or any other vegetable substance in which it is desired to remove outer leaves or husks.

The word "vegetable" as used herein is intended to include all such vegetable substances, and the words "outer leaves" is intended to include all such outer leaves, husks, or other covering.

The invention claimed is:

1. A machine for removing the outer leaves from vegetables, comprising a container having large annular protuberances on the inside thereof, means to rotate said container, and means for directing a blast of air through said container.

2. A machine for removing the outer leaves from vegetables, comprising a rotatably mounted container of a size to receive cabbages for the tumbling thereof, and an air blast device adapted to project a stream of air through said container whereby to distend the outer leaves of cabbages therein and to carry away leaves broken from the cabbages by the tumbling of the cabbages in the container during its rotation.

3. In a machine for removing the outer leaves from vegetables, the combination with a container and means for breaking the leaves from the vegetables therein, of a trap door in the bottom of said container yieldable under the weight of the vegetables therein, and means for removing leaves from the container across said door.

4. A machine for removing the outer leaves from vegetables, comprising the combination with a rotatable container, and means for delivering an air blast therethrough, of an outlet housing for said container provided with an opening in the path of said air blast for the delivery of leaves, and a second opening arranged for downward delivery of vegetables, together with a trap door normally closing said second opening and yieldable under the weight of vegetables.

5. A machine for removing the outer leaves from vegetables, comprising a rotatable container and stationary end closure therefor, means for directing an air blast into said container through one of said closures, the other of said closures being provided with a port for the delivery of such blast and vegetable leaves carried thereby, means for rotating said container, and a trap door in said last mentioned closure between said container and said port over which vegetable leaves are adapted to be transported by said air blast, said door being resiliently supported and yieldable only under the weight of vegetables.

6. The method of removing the outer leaves from vegetables, which comprises jarring the vegetables in a current of air.

7. The method of removing the outer leaves from vegetables, which comprises tumbling the vegetables, rolling the vegetables about while tumbling them, and simultaneously blowing a current of air across the vegetables.

8. The method of removing the outer leaves from vegetables, which comprises tumbling vegetables, and simultaneously blowing a current of air across the vegetables.

9. The method of removing the outer leaves from vegetables, which comprises tumbling the vegetables, advancing the vegetables in a predetermined direction while tumbling them directing a current of air across the vegetables.

10. The method of removing the outer leaves from vegetables, which method comprises tumbling the vegetables whereby to break such outer leaves therefrom.

11. The method of removing the outer leaves from vegetables, which method comprises blowing such leaves to project away from the vegetables and impacking the outwardly projecting leaves for the breakage thereof.

12. The method of removing the outer leaves from vegetables which comprises tumbling the vegetables in a blast having sufficient force to distend the leaves thereof from the vegetables whereby the distended leaves will be broken by the tumbling.

13. The method of removing the outer leaves from vegetables, which comprises tumbling the vegetables, advancing the vegetables in a predetermined direction while tumbling them, directing a current of air across the vegetables, and separating by gravity the vegetables and the leaves detached therefrom in tumbling.

14. The method of removing the outer leaves from vegetables, which comprises tumbling the vegetables, advancing the vegetables in a predetermined direction while tumbling them, rolling the vegetables about in the course of their tumbling and their advance, directing a current of air across the vegetables, and separating by gravity the vegetables and the leaves detached therefrom in tumbling.

HENRY E. HAMILTON.
ADOLPH HAMILTON.
FREDERICK C. KRUEGER.